Oct. 14, 1958  J. C. TESCULA  2,855,918
CHARCOAL BROILER
Filed June 16, 1953

John C. Tescula
INVENTOR.

United States Patent Office 2,855,918
Patented Oct. 14, 1958

2,855,918
CHARCOAL BROILER
John C. Tescula, Cleveland, Ohio
Application June 16, 1953, Serial No. 361,923
1 Claim. (Cl. 126—25)

This invention relates generally to outdoor equipment and pertains more particularly to an improved form of charcoal broiler.

A primary object of this invention is to provide a compact and easily portable charcoal broiler assembly which incorporates a minimum number of parts in its construction and wherein the assembly is adjustable to effect the desired degree and rapidity of cooking.

Figure 1:
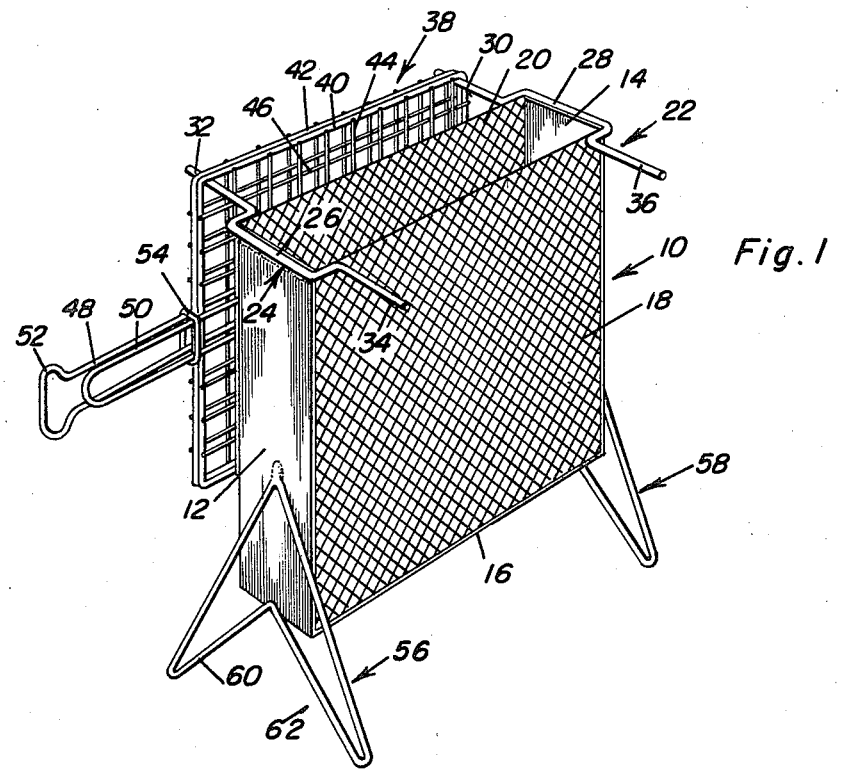
Figure 2:
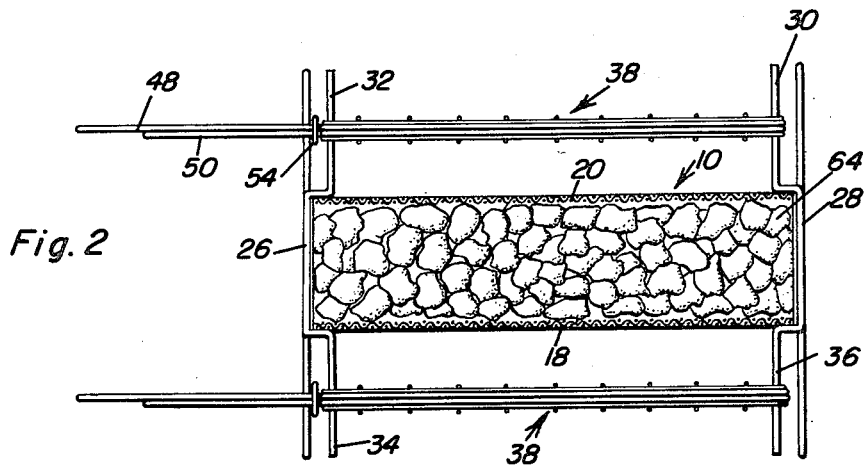

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the broiler assembly;
Figure 2 is a plan view of the broiler assembly showing the same in operation.

Referring now more particularly to the drawings, reference numeral 10 indicates generally the burner assembly which includes the end walls 12 and 14, the bottom wall 16 and the side wall members 18 and 20, thus providing an open top receptacle for receiving chunks of charcoal therein to provide a fire box assembly therefor. It will be noted that the end wall and the bottom are formed of sheet material and that the side wall members are formed of foraminous material for a purpose presently apparent.

Support rod assemblies indicated generally by the reference characters 22 and 24 are provided on the assembly and include the intermediate or center portions 26 and 28 which are suitably secured to the upper edge of the end wall 12 and 14 respectively and these support rod assemblies also include the end portion 30, 32, 34 and 36 which are disposed in offset relation to the intermediate portion and which extend laterally in a horizontal fashion beyond the side walls 18 and 20.

The food holder 38 takes the form of juxtaposed grill members including the open peripheral frame members 40 and 42 interconnected by the transverse and longitudinal grill bars 44 and 46 respectively, thus forming an open or lattice construction. Each of the frames of the holders are provided with handle members 48 and 50, one of which is provided with an enlarged end portion 52 preventing the removal of the slip rings 54 therefrom, the slip rings surrounding both of the handle members to urge the side plates of the holder together to retain food such as meat or the like therebetween. It will be obvious that since the handle member 50 is shorter than the handle member 48, the slip ring may be slid over the end of the handle 50 so that the two side plates of the holders may be separated and in this respect it is to be noted that it may be preferred to fittedly secure the forward ends of these side plates together.

Support leg assemblies 56 and 58 are secured to respective end walls 12 and 14 and include the divergent loop leg portions 60 and 62 whose lower ends are adapted to rest upon the ground surface and support the latter assembly in spaced relation to the same.

As seen most clearly in Figure 2, charcoal 64 is disposed within the fire box or burner assembly and is ignited to produce an even glowing heat which radiates outwardly of the broiler through the side wall members 18 and 20 to properly cook food disposed within the holder 38. In this respect, it will be apparent that the holders are slidable on the rod assemblies toward and away from their associated wall portion of the burner so that the desired degree and rapidity of cooking may be obtained in this manner. Also, it will be manifest that it will probably be desirable to move the holder assemblies closer to the burner as the fire therein dies down. It will be seen that the support rod assemblies extend transversely from the side walls 18 and 20 the same distance as the outer ends of the loop leg portions, and thus the broiler may be supported with the side walls being disposed horizontally for supporting a coffee pot, frying pan, etc.

The assembly being light in weight and compact in construction may be easily carried and presents no undue encumbrance even to the camper traveling on foot.

The end walls are formed of solid sheet material to minimize radiation of heat from the burner assembly in as much as any heat radiating therefrom is entirely lost insofar as cooking is concerned and the bottom of the burner is likewise formed of solid sheet material for the same reason and for the reason to prevent undue loss of glowing charcoal from the burner assembly. Obviously, the side wall members are to be formed of fine enough mesh to prevent loss of charcoal from the burner and yet allow proper radiation of heat from the glowing charcoal.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of the construction shown.

Having now described the invention, the construction, the operation and use of a preferred embodiment thereof, and the advantageous new and useful results obtained thereby, the new and useful construction, and reasonable mechanical equivalents thereof, obvious to those skilled in the art, are set forth in the appended claim.

What is claimed as new is as follows:

A charcoal broiler consisting of a strip formed into a U-shape to provide the bottom and end walls of a charcoal receptacle, a pair of rectangular perforated side walls peripherally secured to corresponding edges of said bottom and end walls, said receptacle having an unobstructed entrance at the end opposite said bottom, means for selectively supporting said receptacle in a vertical and horizontal position, said means including a support rod for each of said end walls and located adjacent to said unobstructed entrance, each support rod having an intermediate part which is rigidly fixed to its end wall and a pair of right angular portions extending inwardly a short distance and then outwardly of said side walls with the parts that protrude outwardly constituting legs when the receptacle is in the horizontal position and constituting hangers for one or more food holders when the receptacle is in the vertical position, a leg assembly for each of said end walls, each leg assembly including a rod which is rigidly fixed to its end wall and having loops that protrude laterally from said side walls distances the same as the distances that said right angular portions protrude from said side walls so that said loops with said right angular portions constitute legs of equal length for the broiler when the broiler is in the horizontal position either on the left or the right side thereof.

References Cited in the file of this patent
UNITED STATES PATENTS

| | | |
|---|---|---|
| 2,048,769 | Anderson | July 28, 1936 |
| 2,201,756 | Avetta | May 21, 1940 |
| 2,619,951 | Kahn | Dec. 2, 1952 |